Nov. 24, 1931.  V. PANOFF  1,833,755

SHAFT SUPPORT

Filed March 18, 1929

Inventor:
Vincent Panoff,
by Charles V. Tulla
His Attorney.

Patented Nov. 24, 1931

1,833,755

UNITED STATES PATENT OFFICE

VINCENT PANOFF, OF NEUILLY-PLAISANCE, FRANCE, ASSIGNOR TO GENERAL ELECTRIC COMPANY, A CORPORATION OF NEW YORK

SHAFT SUPPORT

Application filed March 18, 1929, Serial No. 347,851, and in France March 26, 1928.

My invention relates to resilient mountings for high speed shafts such as motor shafts employed for driving centrifugal separators, dryers, spinning frame spindles, rayon buckets or the like.

Motors of this kind are generally run at very high speed and, in the case of rayon motors, for example, the speed may be as high as ten or twelve thousand revolutions per minute. The motor shafts and devices driven thereby are ordinarily slightly unbalanced. As a result, when the motors pass through a critical speed of the shaft and device carried thereby oscillations are set up in the motor shaft. It has been the practice heretofore to resiliently support the motors so as to reduce the amplitude of these shaft vibrations. Ordinarily these resilient mountings have offered uniform resistance to vibration of the shaft equally in all directions radially of the shaft, so that the unbalancing force acting on the shaft at this critical speed causes very pronounced vibration of the shaft on its supports.

The object of my invention is to provide a resilient mounting for a high speed shaft which will substantially reduce vibrations of the shaft in passing through its critical speed. I accomplish this by providing a resilient support for the shaft which offers widely different resisting forces to vibration of the shaft about axes at right angles to each other and to the shaft.

My invention will be more fully set forth in the following description referring to the accompanying drawings and the features of novelty which characterize my invention will be pointed out with particularity in the claims annexed to and forming a part of this specification.

Figure 1:
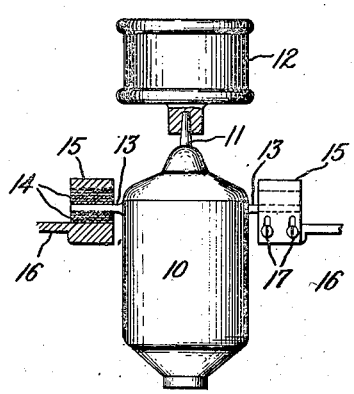
Figure 2:
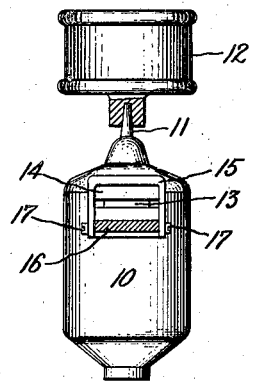
Figure 3:
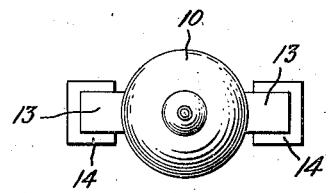

In the drawings Fig. 1 is a side elevation of a rayon motor having a resilient mounting embodying my invention, the structure being partly broken away; Fig. 2 is a side elevation of the motor shown in Fig. 1 showing the motor lugs and resilient supports in end elevation, and Fig. 3 is a plan view of the motor shown in Figs. 1 and 2 with the rayon bucket removed, the motor lugs and resilient supports being shown in elevation.

Referring to the drawings, for convenience in illustration, I have shown my invention in connection with a rayon motor 10 having a vertically arranged shaft 11 on which the usual form of rayon bucket 12 is supported.

In accordance with my invention, vibration of the motor shaft 11 of dangerous amplitude is avoided when it is passing through its critical speed by resiliently supporting the motor and its shaft, so that the resilient support offers widely different resisting forces to vibration of said motor about axes at right angles to each other and to the motor shaft. This may be done in any convenient manner, but in the construction illustrated I do this by providing flat lugs 13 secured to the frame of the motor 10 and arranged with their sides presented axially of the motor. The lugs 13 are secured between pads 14 of rubber or other suitable material by a U-shaped clamp 15 which is fastened to a supporting member 16 by bolts 17. By this construction oscillation of the motor 10 about axes perpendicular to the axis of the lugs 13 and to the motor shaft 11 is greatly resisted by the resilient pads 14, and the moment of this force is quite large because the lugs and pads are at some distance from the shaft axis. On the other hand, oscillation of the motor 10 about an axis passing through the lugs 13 and at right angles to the shaft 11 is resisted by a much less force than the above considered resistance to oscillation of the motor about the axes at right angles thereto. This is due to the fact that oscillation of the motor about the axis through the lugs 13 is resisted mainly by that portion of the pads 14 engaging the edges of the lugs 13. The lever arm of the force which resists oscillation of the motor 10 about the axis of the lugs 13 is approximately half of the width of the lugs so that the moment of resistance thereof is small as compared to the moment of resistance exerted by the pads to oscillations of the motor frame about an axis at right angles to the lugs 13 and to the shaft 11. In this way when the shaft 11 passes through its critical speed the provision of unequal elastic resistance to vibration of the motor frame about axes at right angles to each other prevents building up of vibration in the shaft 11 of dangerous amplitude.

Although I have shown my invention in connection with a vertical shaft rayon motor, it is apparent that my invention is applicable to any high speed shaft mounting. I desire it to be understood therefore that my invention is not limited to the particular arrangement shown and described, and I intend in the appended claims to cover all modifications of my invention which do not depart from the spirit and scope thereof.

What I claim as new and desire to secure by Letters Patent of the United States is:

1. A support for a motor having a frame, a rotatable shaft comprising a supporting member for said frame, means including flat radial projections on opposite sides of said frame having their sides presented axially of said shaft and resiliently connected to said supporting member for resiliently connecting said frame to said supporting member and for offering widely different resisting forces to vibrations of said shaft about axes at right angles to each other and said shaft.

2. A support for a motor having a frame, a rotatable shaft comprising a supporting member for said frame and means including flat radial projections on opposite sides of said frame having their sides presented axially of said shaft and being secured between resilient pads carried by said supporting member for resiliently connecting said frame to said supporting member and for offering widely different resisting forces to vibrations of said shaft about axes at right angles to each other and said shaft.

In witness whereof, I have hereunto set my hand, this 5th day of March, 1929.

VINCENT PANOFF.